United States Patent [19]
Grawey et al.

[11] 3,802,744
[45] Apr. 9, 1974

[54] SPLIT RIM ASSEMBLY FOR EARTHWORKING VEHICLES

[75] Inventors: Charles E. Grawey, Peoria; Keith E. Koch, Tremont; Robert W. Untz, Hanna City, all of Ill.

[73] Assignee: Caterpillar Tractor Co., Peoria, Ill.

[22] Filed: Aug. 24, 1972

[21] Appl. No.: 283,375

[52] U.S. Cl.............................................. 301/63 DS
[51] Int. Cl............................................... B60b 3/08
[58] Field of Search ...... 301/63 DS, 63 DT, 63 DD, 301/35 R, 11 CD, 10 R, 6 R, 6 S; 180/10, 75

[56] References Cited
UNITED STATES PATENTS
3,090,456   5/1963   Blenkle................................ 180/10
2,087,684   5/1937   Alessi-Grimaldi.................. 301/6 R

*Primary Examiner*—Kenneth H. Betts
*Assistant Examiner*—Reinhard J. Eisenzopf
*Attorney, Agent, or Firm*—Fryer, Tjensvold, Phillips & Lempio

[57] ABSTRACT

Heavy duty earthmoving vehicles operating on irregular terrain experience high vehicle-to-rim-to-tire loadings which can be accommodated by a lightweight multi-piece rim assembly employing a fluted mounting bell with a mounting ring at its outboard end and a radially disposed flange or lip at its mouth to which several inwardly directed support webs of two matching roll formed rim wall halves are bolted to complete the lightweight rim which can be mounted in a cantilevered manner through the mounting ring so a support surface formed on the inner periphery of the mouth of the mounting bell is positioned closely adjacent to a cooperating hub support ring formed on the outer surface of the hub of the vehicle on which the rim assembly is mounted. This allows the heavier loadings to be transmitted through these coacting surfaces which are located remotely from the mounting ring by which the rim is attached to the outboard end of the hub.

5 Claims, 3 Drawing Figures

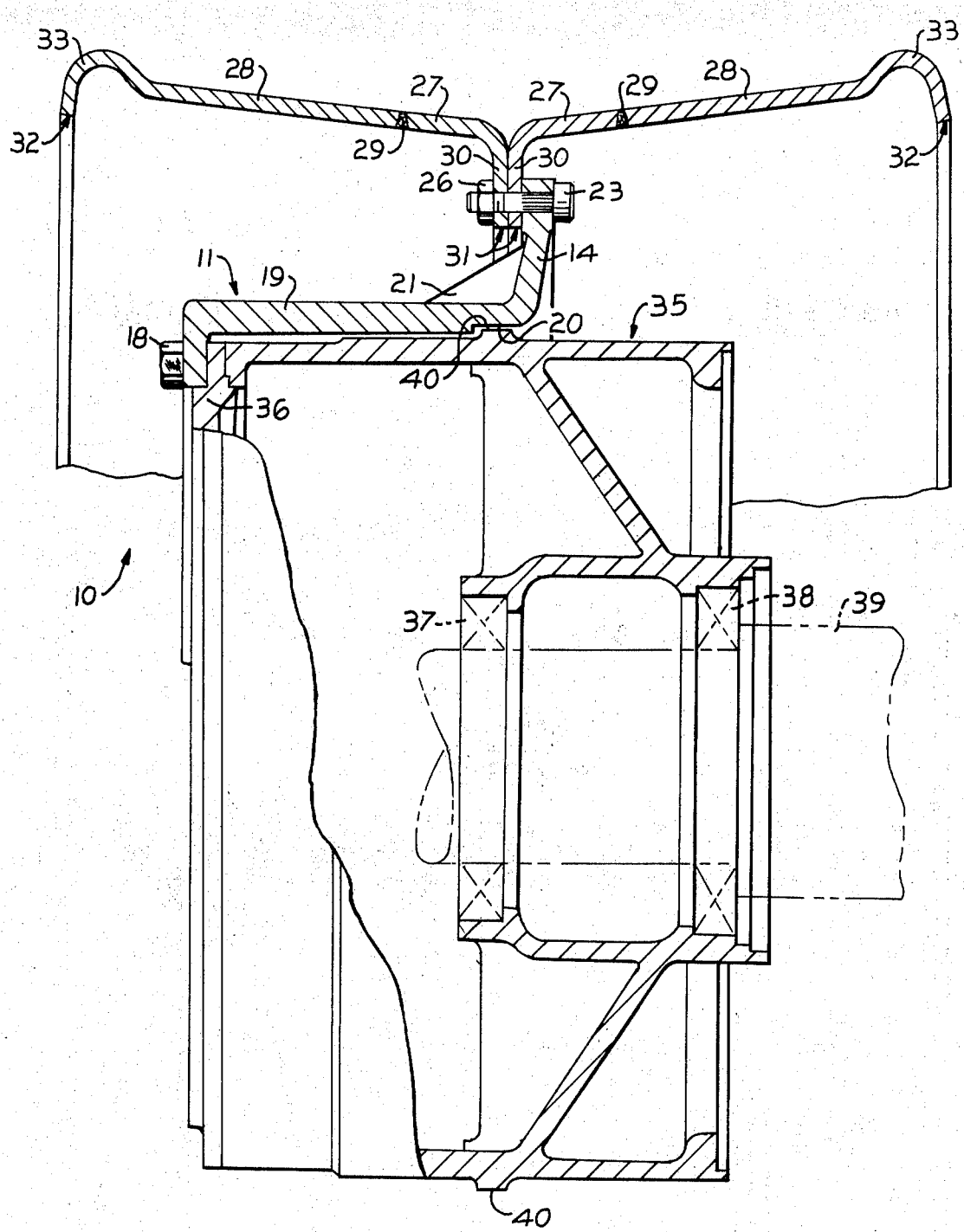

SPLIT RIM ASSEMBLY FOR EARTHWORKING VEHICLES

BACKGROUND OF THE INVENTION

In earthmoving vehicles, it is common practice to employ planetary reduction gearing in the drive wheel hubs of such large vehicles through which these vehicles are supported by and attached to the rim and tire. Thus, the rim structure commonly supports the vehicle on the tire and often serves to transmit the torque from the reduction gearing to the ground. As a result, it is not uncommon to use castings for the rims in such vehicles because of the heavy, diverse loadings developed on the rim during the operation of the vehicle, especially in irregular terrain. Further, it is desirable to mount the rim on the hub so that the loadings are centrally applied to the hub structure rather than being transmitted through the outboard ends of these hubs. Sometimes the hubs and rims are formed as an integral unit because of the large forces developed in the hub and rim structures in these types of vehicles. However, in such cases damage to the rim assembly requires a costly replacement of the composite unit.

Further, castings are expensive and therefore it is an object of this invention to provide an economical, lightweight rim assembly, which is fabricated in part by rolling and forming techniques to withstand the heavy loadings and also has a split rim which is easy to mount and remove from the hub, as well as a rim on which the pneumatic tires supported thereon can be easily mounted and demounted.

A further object of this invention is to provide a split rim structure which is especially suitable for tube type beadless tires such as those described in U.S. Pat. No. 3,606,921, issued to Grawey.

SUMMARY OF THE INVENTION

Generally, the above objects and advantages can be achieved by a split rim assembly for mounting a pneumatic tire carcass on heavy duty earthmoving vehicles which includes a mounting bell having an inwardly directed mounting ring at its outboard end and an outwardly directed flange at its mouth, with the wall of the mounting bell having a fluted wall surface to increase its strength and a generally annular support surface disposed circumferentially about the inner periphery of its mouth along with a pair of symmetrical cup-shaped rim wall halves having an inwardly directed support web at their innermost edge and an outwardly directed rolled flange at their outer edge which are joined to the outwardly directed flange of the mounting bell with bolts to complete the full tire rim wall whereby a substantial portion of the vehicle-to-rim loading can be transmitted between an associated hub having a support ring cooperating with the support surface around the mouth of the bell when the mounting bell has its mounting ring attached to the outboard end of such an associated hub.

BRIEF DESCRIPTION OF THE DRAWINGS

FIG. 3 is a section through a portion of the multi-piece rim assembly mounted on the vehicle hub, illustrating how the vehicle-to-rim loadings are transmitted between the hub and rim assembly in its cantilevered mounting arrangement with the hub.

DESCRIPTION OF A PREFERRED EMBODIMENT

Figure 1:
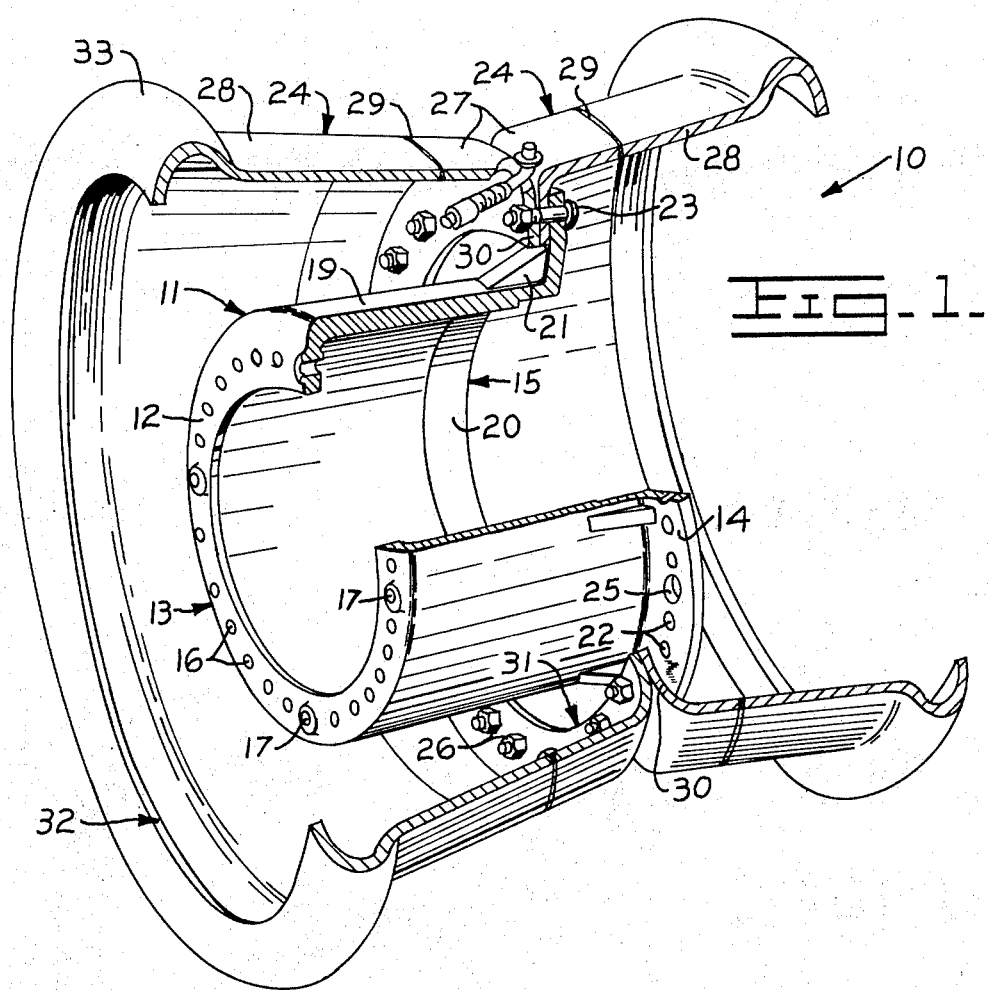
FIG. 1 is a perspective with parts broken away to show the details of the multi-piece rim assembly.

In FIG. 1, due to the broken away portions, the details of the multi-piece rim assembly 10 are best shown. It includes a mounting bell 11 having a mounting ring 12 at its outboard end 13 and an outwardly directed radial flange 14 at an inboard mouth 15 of the mounting bell. A plurality of attaching holes 16 along with several locating holes 17 are formed in the mounting ring through which cap screws 18 are passed and threaded into an end of an associated hub structure after the ring is positioned by locator pins (not shown) inserted in the locating holes and which project from the end of an associated hub.

Internally of the mounting bell 11 and a circular wall 19 intermediate the ring 12 and flange 14 is an annular support surface 20 disposed around the inner periphery of the mouth 15. The support surface is usually machined to obtain the desired tolerances for the clearances which are required. Externally of the mounting bell, a plurality of circumferentially spaced, triangular shaped flutes or webs 21 are formed between the wall 19 and the radial flange 14 to strengthen the wall where it is belled outwardly to form the flange around its periphery. This arrangement provides sufficient rigidity in the radial flange and wall at the inboard mouth 15 for handling the lateral or axial loadings in the rim structure. The radial flange includes a plurality of bolt holes 22 in which capped studs 23 are press-fitted for mounting the matching rim wall halves 24. Also, several larger holes 25 are formed in this radial flange to accept keeper bolts (not shown) that independently hold the two matching and symmetrical rim wall halves together when they are removed from the capped stud bolts 23. This arrangement allows the tire to be assembled on the rim wall halves and these halves to be joined independently with the keeper bolts so the tire and rim walls can be removed as a unit or replaced as a unit, when all the nuts 26 have been removed from the capped stud bolts.

The matching or symmetrical rim walls 24 are identical so only one of these structures will be described in detail. In the rim larger sizes, each cup-shaped rim wall half is formed from two parts, an inner flared cone portion 27 and an outer flared portion 28 that are joined with a circular welded seam 29 to form each conical shaped rim wall half. Each inner flared cone portion 27 includes an inwardly directed support web 30 that forms a radial rim about its base in which a plurality of holes are circumferentially disposed about its large central aperture 31. These holes are arranged to register with the capped stud bolts 23 when this portion of the rim wall assembly is telescoped over the mounting bell 11 and its support web is brought into registry with the radial flange 14 on the bell.

At the outer peripheral edge 32 of the outer flared cone portion 28 of each rim wall half the metal is rolled to form a raised ring flange 33 which is somewhat semi-circular in cross section. The ring flange is raised from the surface of the rim wall to hold the tire carcass on the rim wall as well as to provide a rounded surface that the sidewall of the tire carcass can deflect against during severe service without damage. Due to the semicircular configuration of this ring flange, the outermost edges of the rim wall are greatly strengthened and the rim wall has high rigidity from its web 30 to its outer edge.

Figure 2:
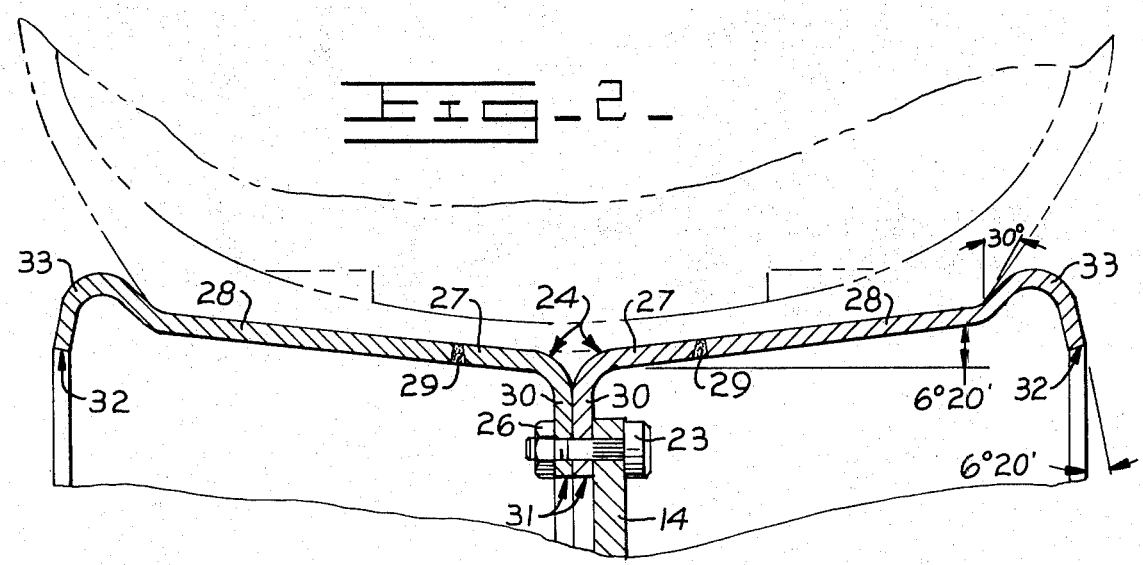
FIG. 2 is a section through the rim wall of the multi-piece rim assembly with parts broken away and with a portion of a tire shown in phantom thereon.

In FIG. 2, the configuration of each rim wall half 24 is better illustrated. It can be seen that the flared taper of the conical wall of the joined cone portions 27 and 28 of each rim wall is approximately 6° and that the ring flange 33 raises from the rimmed wall surfaces formed by rolling the outer edge outwardly until its surface makes an angle of approximately 30° with a radial plane through the rim wall, and thereafter this edge is rolled about a small radius until the outermost edge forms an inwardly directed ring or flange that terminates below the adjacent portion of the rim wall.

While this multi-piece rim assembly is primarily designed for tube-tires, such as described in the aforementioned patent, they also can be used for beaded tires with tubes or with beaded tubeless tires if a seal is placed in the V-groove formed where the two inwardly directed webs of the rim wall halves 24 are joined to form the complete rim wall.

In FIG. 3, the cantilevered mounting of the multi-piece rim assembly 10 is best illustrated with the mounting bell 11 telescoped over the end of a cast hub 35 and attached to its outboard end with cap bolts 18, which also secure the cover plate 36 on the end of the hub. This large diameter hub may include reduction gearing (not shown) and is journaled by bearings 37 and 38 on an axle 39 (all shown in phantom), the latter of which rotatably supports the hub and mounting bell. As can be seen in FIG. 3, the support surface 20 which is machined in the wall 19 of the mounting bell is positioned radially outwardly with respect to a raised support ring 40 on a central outer surface of the hub when the rim assembly is mounted on the hub with the cap bolts as described. The nominal or predetermined radial clearance between the support ring 40 and the support surface 20 is in the order of four to twenty thousandths of an inch, and when high hub-to-rim loading occurs the mounting bell may distort, allowing a substantial portion of the loading to be directly transmitted across these surfaces and centrally applied to the hub and more uniformly distributed on the bearings 37 and 38.

What is claimed is:

1. A split rim assembly for a pneumatic carcass comprising:
  a mounting bell having a radially directed mounting ring at its outboard end and an outwardly directed radial flange at its mouth, said mounting bell having a cylindrical wall between its radial flange and its mounting ring and a generally annular support surface about the inner periphery of its mouth; and
  a pair of cup-shaped rim wall halves each having an inwardly directed support web at its inner edge and a rolled raised outer rim edge, said rim wall halves being conically shaped and having an increasing taper from their support web to their rolled raised outer rim, said rim wall halves having their support webs joined together and with the radial flange of the mounting bell to form a rim wall for the assembly which is adapted to be mounted through said mounting ring on an end of the hub so said support surface is cantilevered over a closely adjacent support ring on the hub allowing heavy vehicle-to-hub-to-rim loadings to be transmitted through said support surface as said mounting bell distorts.

2. The split rim assembly defined in claim 1 wherein the increasing taper is approximately 6° from the support web to the rolled raised outer rim edge.

3. The split rim assembly defined in claim 1 wherein each rolled raised outer rim edge is rolled until its periphery edge portion forms an inwardly directed flange to add strength and rigidity to said rolled raised outer rim edge.

4. The split rim assembly defined in claim 4 wherein the support web of the rim wall halves are bolted to the radial flange of the mounting bell.

5. A split rim and hub assembly combination comprising:
  a cylindrical hub for an earthmoving vehicle having mounting means on its outboard end and a raised outer support ring encircling its central portion; and
  a split rim assembly including a mounting bell having an inwardly directed mounting ring at its outboard end adapted to mount with said mounting means of said hub with said bell telescoped on said hub, said mounting bell having an outwardly directed radial flange at its mouth and a bell wall forming an annular support surface about the inner periphery of said mouth which is radially spaced outwardly of said support ring with a clearance of several thousandths of an inch when said mounting ring is attached through said mounting means and a pair of cup-shaped rim wall halves each having an inwardly directed support web at its inner edge and a rolled raised outer rim edge, said rim wall halves having their support webs joined together and attached to said radial flange of said mounting bell whereby a portion of the loads transmitted through a tire retained on said rim assembly telescopingly mounted on said hub can be transmitted through said support surface and said outer support ring of said hub when said mounting bell on said hub distorts due to such loads acting on the cantilevered mounting arrangement.

* * * * *

Disclaimer

3,802,744.—*Charles E. Grawey*, Peoria; *Keith E. Koch*, Tremont; and *Robert W. Untz*, Hanna City, Ill. SPLIT RIM ASSEMBLY FOR EARTH-WORKING VEHICLES. Patent dated Apr. 9, 1974. Disclaimer filed Feb. 22, 1983, by the assignee, *Caterpillar Tractor Co.*

Hereby enters this disclaimer to claims 1–4 of said patent.

[*Official Gazette April 19, 1983.*]